United States Patent [19]

Lockwood et al.

[11] Patent Number: 5,692,103
[45] Date of Patent: Nov. 25, 1997

[54] METHOD OF SPEECH RECOGNITION WITH LEARNING

[75] Inventors: Philip Lockwood, Antony; Patrice Alexandre, les Essarts le Roi, both of France

[73] Assignee: Matra Communication, Cedex., France

[21] Appl. No.: 230,140

[22] Filed: Apr. 20, 1994

[30] Foreign Application Priority Data

Apr. 23, 1993 [FR] France ................... 93 04849

[51] Int. Cl.$^6$ ........................................ G10L 5/06
[52] U.S. Cl. .............. 395/2.42; 395/2.41; 395/2.45
[58] Field of Search ................. 395/2.42, 2.41, 395/2.4, 2.45, 2.64, 2.65; 381/36–43

[56] References Cited

U.S. PATENT DOCUMENTS

| | | | |
|---|---|---|---|
| 4,937,872 | 6/1990 | Hopfield et al. | 381/43 |
| 5,027,406 | 6/1991 | Roberts et al. | 381/43 |
| 5,127,055 | 6/1992 | Larkey | 381/43 |
| 5,150,449 | 9/1992 | Yoshida et al. | 395/2 |
| 5,345,536 | 9/1994 | Hoshini et al. | 395/2.52 |
| 5,404,422 | 4/1995 | Sakamoto et al. | 395/2.41 |
| 5,440,661 | 8/1995 | Papcun | 395/2.41 |

OTHER PUBLICATIONS

"Spectral Analysis Using Generalized Cepstrum" T. Kobayashi et al IEEE Trans on Acoustics, Speech, and Signal processing, vol. ASSP–32 N° 5, Oct. 1984, pp. 1087–1089.
"Low dimensional representation of vowels based on all-–pole modeling in the psychophysical domain" H. Hermansky et al, Speech communication, 1985, vol. 4, pp. 181–187.
"Linear predictive modeling of speech in modified spectral domains" H.Hermansky et al, STL Research Reports N° 1, Nov. 1987 pp. 5.1–5.20.
International Conference on Acoustics Speech and Signal Processing vol. 2, 14 mai 1991, Toronto Canada pp. 957–960, Wu et al., "Fast self adapting broadband noise removal in the cepstral domain" (May 1991).
Treizieme Colloque sur le Traitement du Signal et des Images (Gretsi) 16 Sep. 1991, Juan les Pins France, pp. 733–736. Faucon, le Bouquin "Débruitage de la parole pour les radio–mobiles".
"Spectral Root Homomorphic Deconvolution System", J.S. LIM IEEE Trans. on Acoustics, Speech and Signal Processing, vol. ASSP–27 N° 3, Jun. 1979, pp. 223–233.
"Optimization of perceptually–based ASR front–end" H. Hermansky et al Proc. IEEE–ICASSP, 1988, pp. 219–222.
"Use of Generalized Cepstral Distance Measure in Isolated Word Recognition", T. Kobayashi et al. Electronics and Communications in Japan. Part 3, vol. 72, N° 6, 1989, pp. 1–8. Translated from Denshi Joho Isushin Gakkai Ronbunshi, vol. 71–A, N° 3, Mar. 1988, pp. 608–615.
"Perceptual linear predictive (PLP) analysis of speech" H.Hermansky J. Acoust. Soc. Am 87(4), Apr. 1990, pp. 1738–1752.
"Non–linear spectral subtraction (NSS) and hidden markov models for robust speech recognition in car noise environments" P.Lockwood et al Proc. IEEE–ICASSP 1992 pp. I.265–I.268.

(List continued on next page.)

Primary Examiner—Allen R. MacDonald
Assistant Examiner—Richemond Dorvil
Attorney, Agent, or Firm—Larson & Taylor

[57] ABSTRACT

In the recognition phase, the signal originating from a sensor is processed to obtain parameters which are compared with those stored in a dictionary in the learning phases so as to recognize the voice structures uttered by the user in a noisy environment. The obtaining of the said parameters during the learning and recognition phases includes the formation of digital frames of predetermined length from the signal originating from the sensor, the transformation of each frame from the time domain to the frequency domain to obtain a spectrum $X(i)$, and the application of an inverse transformation, from the frequency domain to the time domain, to the magnitude $|X(i)|^\gamma$, where $|X(i)|$ represents the modulus of the spectrum and $\gamma$ represents an appropriate exponent.

15 Claims, 3 Drawing Sheets

OTHER PUBLICATIONS

"Experiments with a Nonlinear Spectral Subtractor (NSS), Hidden Markov Models and the projection, for robust speech recognition in cars" P. Lockwood et al, Speech Communication vol. 11(2–3) 1992, pp. 215–228.

"Spectral Estimation of Speech by Mel–Generalized Cepstral Analysis" K. Tokuda et al. Electronics and Communications in Japan, vol. 76 N° 2, 1993, pp. 30–43. Translated from Denshi Joho Tsushin Ronbunshi, vol. 75–A, N° 7, Jul. 1992, pp. 1124–1134.

METHOD OF SPEECH RECOGNITION WITH LEARNING

BACKGROUND OF THE INVENTION

The present invention relates to a speech processing method comprising a learning phase during which a signal originating from a sensor is processed to obtain parameters which represent voice structures uttered by a user in a mildly noisy environment and which are stored in a dictionary, and a recognition phase during which the signal originating from the sensor is processed to obtain parameters which are compared with those stored in the dictionary so as to recognize the voice structures uttered by the user in a noisy environment.

Such a method can in particular be applied in the sphere of voice operation. In the typical example of a car radio-telephone, it is desired to enable the user to operate the dialling of the telephone numbers by uttering the name of his opposite parties. A directory of prerecorded numbers is then associated with the dictionary in which are stored the representations of the names of the opposite parties which have been memorized during the learning phase.

Cepstral representations are nowadays the basis of most speech recognition systems. The prime aspect of this representation is that it enables the semantic information contained in the speech to be isolated to some extent, by non-linear filtering, from the esthetic information specific to the speaker (cf. "Homomorphic Analysis of Speech" by A. V. Oppenheim and R. W. Schafer, in IEEE Trans. Audio Electroacoust., Vol. AU-16, June 1968, pages 221 to 226). This approach uses a deconvolution technique based on logarithmic compression of the amplitude of the modulus of the speech spectrum. The coefficients obtained by inverse Fourier transformation of this logarithm spectrum are called cepstral co-efficients (this name corresponds to the inverting of the first syllable of the spectrum word, given the inverse Fourier transformation which relates these coefficients to the spectrum). It is these coefficients which in general form the subject of the recognition which, usually, calls upon hidden Markov models and the Viterbi algorithm.

A major difficulty is that the learning phase is in general performed in the absence of noise (car at rest), whilst the recognition can take place in a noisy environment (car in motion). This results in a mismatch which affects the efficiency of the recognition system.

One object of the invention is to reduce the effect of this mismatch on the rate of recognition of the words uttered in a noisy environment.

SUMMARY OF THE INVENTION

With this object, the invention proposes a method of the type indicated at the start, wherein the obtaining of the said parameters during the learning and recognition phases includes the formation of digital frames of predetermined length from the signal originating from the sensor, the transformation of each frame from the time domain to the frequency domain to obtain a spectrum X(i), and the application of an inverse transformation, from the frequency domain to the time domain, to the magnitude $|X(i)|^\gamma$, where $|X(i)|$ represents the modulus of the spectrum and $\gamma$ represents an exponent lying between 0 and 2. Stated otherwise, the homomorphic transformation (Fourier transform→logarithm→inverse Fourier transform) conventionally used to obtain the cepstral coefficients is replaced by another homomorphic transformation (Fourier transforms→$|.|^\gamma$ root function →inverse Fourier transform) making it possible to obtain so-called "root-cepstral" coefficients. The mathematical properties of this root-cepstral transformation have been studied by J. S. Lim, "Spectral Root Homomorphic Deconvolution system" in IEEE Transactions on Acoustics, Speech and Signal Processing, Vol. ASSP27, No. 3, June 1979, pages 223 to 233. The invention proposes to call upon this transformation for the recognition of speech when there is mismatch with respect to the learning phase by using an exponent $\gamma$ lying between ¼ and ¾, this giving rise to an improvement in the efficiency of recognition.

A main advantage of the use of root-cepstral coefficients in a speech recognition system comes from their robustness to variations in the noise conditions encountered between the learning phase and the recognition phase. This robustness is confirmed by comparison with the conventional cepstral approach (logarithmic compression) to the extent that the highest-energy regions of the spectrum (those which are less affected by the noise) are emphasized in the cepstral root analysis, particularly for values of $\gamma$ near ⅔. It is further possible to accentuate this emphasis phenonmenon by dynamically adapting the value of $\gamma$ to each signal frame.

Thus, in one embodiment of the invention, the exponent $\gamma$, lying between 0 and 2, is adapted dynamically for each frame during the recognition phase, for example through a formula of the type $$\gamma = K \sum_{i=0}^{M-1} \ln(|X(i)|)$$

where K denotes an adaptation factor and N the number of samples per frame.

Another possibility consists, in the recognition phase, in selecting the exponent $\gamma$ from among several discrete values lying between 0 and 2. The inverse transformation, from the frequency domain to the time domain, can thus be applied to each of the magnitudes $|X(i)|^\gamma$ where the exponent $\gamma$ corresponds to the various discrete values, and, for each frame, the exponent $\gamma$ can bet selected by comparing the various parameter sets obtained for the various values of the exponent $\gamma$ with those stored in the dictionary and by retaining the parameter set affording the closest correspondence with one of the voice structures represented in the dictionary. This solution allows optimization of the rate of recognition.

DESCRIPTION OF PREFERRED EMBODIMENTS

Figure 1:
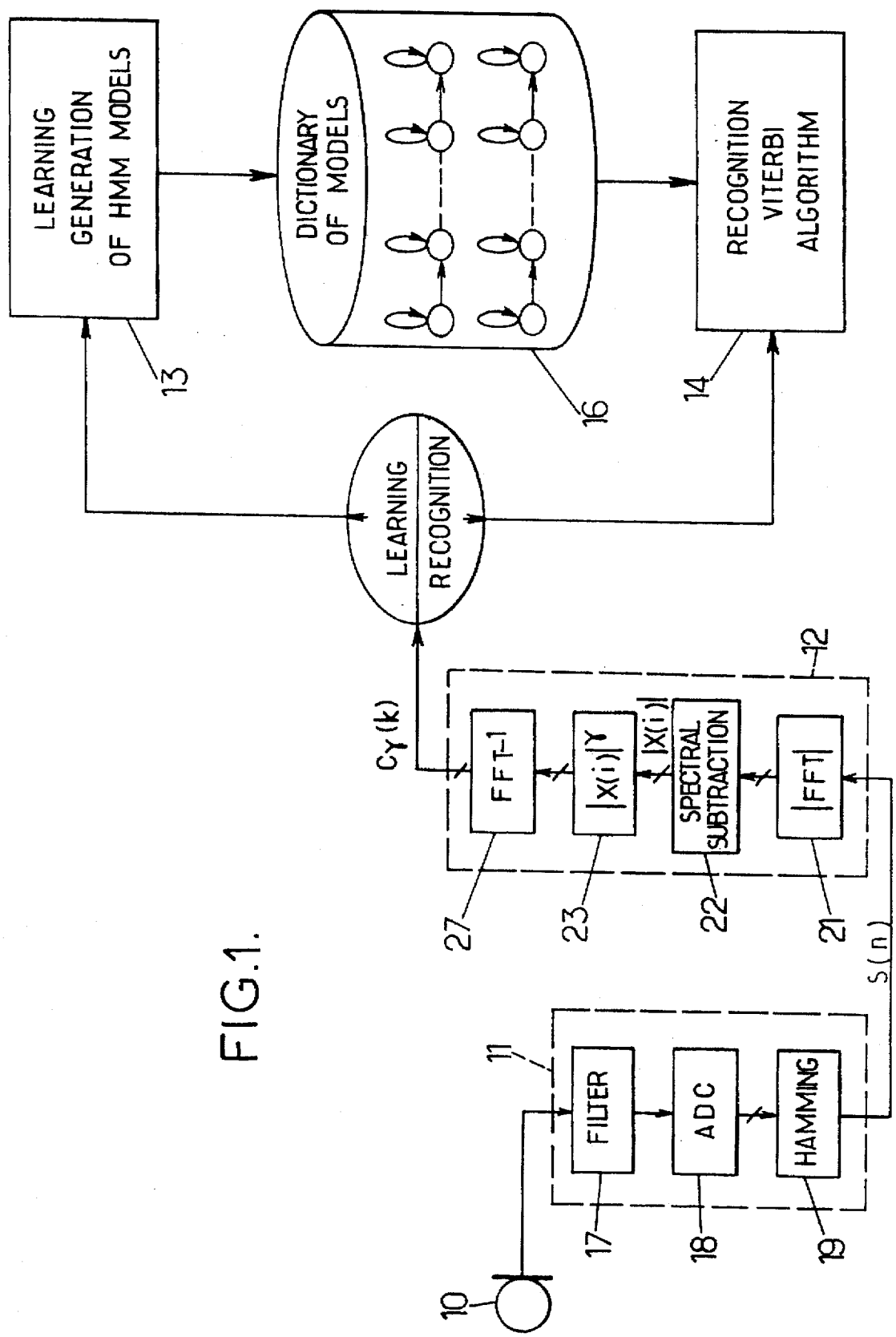
FIG. 1 represents, in schematic form, a speech recognition system implementing the invention.

A speech recognition system comprises, conventionally, a microphone 10, a module 11 for preprocessing the output signal from the microphone 10, a module 12 for calculating coefficients representing the voice structures uttered by the user in front of the microphone, a learning module 13, and a recognition module 14. In FIG. 1 the modules 11 to 14 and the dictionary 16 have been represented in schematic form. It will be understood that, in practice, these means may be incorporated, in full or in part, into a dedicated circuit running appropriate programs, or else include appropriate signal processors.

The preprocessing module 11 produces digital frames S(n) of predetermined length from the output signal from the microphone 10. It includes a filter 17 whose role is to pre-emphasize the output signal from the microphone 10. The filter 17 has a transfer function of the form 1-a/z in the frequency domain, a denoting a coefficient lying between 0.7 and 1. The output from the filter 17 is addressed to an analog/digital converter 18 which samples the signal at a speed of 8 kHz. The samples are produced in the form of frames of N=256 samples, with a time overlap between successive frames (duration of a frame=32 ms). The frames are weighted (at 19) by multiplying each samples n ($0 \leq n \leq N-1$) by a Hamming function such as H(n)=0.54−0.46.cos($2\pi n/N-1$)).

The frames S(n) thus obtained are addressed to the calculation module 12 which, in a first step, applies a fast Fourier transform (bloc 21) to them to obtain a spectrum of the signal for each frame. The spectrum can be obtained for N discrete values of the frequency domain or, in a simplified manner, for N/2 values, given the symmetry of the modulus of the spectrum. The output from the bloc 21 consists of the moduli of the complex values of the spectrum. A spectral subtraction can be carried out on the result of the Fourier transform so as to reduce the contribution from the noise. A description of a module 22 for non-linear spectral subtraction usable in the context of the invention is given in European Patent Application No. 0 534 837. The modulus of the spectrum |X(i)|, corrected by spectral subtraction is next subjected to a $|X(i)|^\gamma$ root compression function for each discrete value i of the frequency domain (bloc 23), $\gamma$ denoting an exponent preferably lying between ½ and ¾. An inverse Fourier transform 27 is then applied to the magnitude $|X(i)|^\gamma$ to provide the root-cepstral coefficients $C_\gamma(k)$. Since the function $|X(i)|^\gamma$ is real and even, the inverse Fourier transform carried out by the bloc 27 can be a cosine transform of the type:

$$C_\gamma(k) = \sum_{i=0}^{N-1} |X(i)|^\gamma \cdot \cos(2\pi k(i+0.5)/N)$$

k denoting the index of the "quefrencies". In practice, it is enough to calculate some twenty coefficients $C_\gamma(k)$, for example $0 \leq k \leq 20$.

In the learning phase, the coefficients $C_\gamma(k)$ are supplied to the learning module 13 which generates HMM type models (continuous-density hidden Markov model) from a certain number of repetitions of each word by the user in a noiseless or mildly noisy environment. These HMM models constitute the parameters which represent the various words to be recognized. They are stored in the memory constituting the dictionary 16 after the learning. For further explanations regarding hidden Markov models, it will, for example, be possible to refer to the articles "Continuous speech recognition using hidden Markov models" by J. Picone, IEEE ASSP Magazine, July 1990, pages 26–41, and "An introduction to hidden Markov models", by L. R. Rabiner et al., IEEE ASSP Magazine, January 1986, pages 4–16.

In the recognition phase, the coefficients $C_\gamma(k)$ are supplied to the recognition module 14 which compares them with the models stored in the dictionary 16 by applying for example weighted Euclidian cepstral distance calculations (see "Experiments with Nonlinear Spectral Subtractor (NSS), Hidden Markov Models and Projection, for robust speech recognition in cars", P. Lockwood, J. Boudy, Speech Communication Journal, No. 11, 1992, pages 215–228), and the Viterbi algorithm.

Figure 5A:
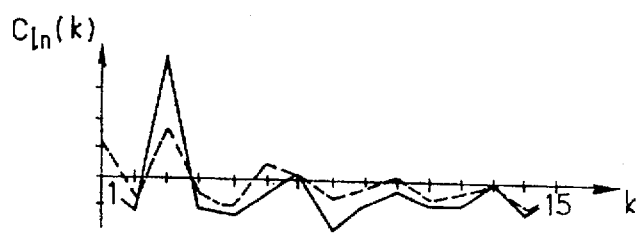
FIGS. 5A and 5B are graphs comparing the coefficients obtained by a conventional logarithmic transformation and by a root transformation according to the invention.
Figure 5B:
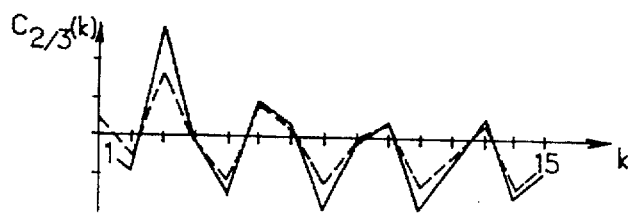

FIG. 5B shows root-cepstral coefficients obtained for an optimal constant value of the exponent ($\gamma=\frac{2}{3}$) in the case of a French female uttering the vowel [i] in a quiet environment (solid line) or noisy environment (car moving at 90 km/h, dashed). FIG. 5A shows the coefficients obtained conventionally with a logarithmic compression function under the same conditions. It is seen that the noise affects the coefficients obtained according to the invention substantially less, particularly for the indices k of high order.

The spectral subtraction 22 and pre-emphasizing by the filter 17, which are not obligatory, also contribute to improving the recognition rate. This improvement appears in Table I, wherein are indicated the recognition rates in %, obtained for the optimal value $\gamma=\frac{2}{3}$ by using the Matra database which includes forty-three French words uttered by four different speakers with four utterances for the learning. The favorable effect of the pre-emphasizing is surprising since it is hardly observed when using the conventional homomorphic transformation with logarithmic compression function.

TABLE I

|  | without spectral subtraction | with spectral subtraction |
| --- | --- | --- |
| without pre-emphasis | 64.9 | 92.7 |
| with pre-emphasis (a = 0.98) | 91.1 | 98.0 |

The root-cepstral coefficients $C_\gamma(k)$ may undergo a certain number of other transformations before being addressed to the learning module 13 or recognition module 14. For example, learning and recognition may pertain to the time derivative of order 1 or of order 2 of the root-cepstral coefficients, calculated in discrete form. The derivative of order 1 can be calculated through the formula $$\Delta C_\gamma(k,t) = \sum_{\tau=t-j}^{t+j} (\tau - t) \cdot C_\gamma(k,\tau)$$

where t represents the time index of the current frame, $C_\gamma(k,t)$ represents the root-cepstral coefficient of index k for the frame of index t, and j represents an integer less than 4. Similarly, the derivative of order 2 is expressed by $$\Delta^2 C_\gamma(k,t) = \sum_{\tau=t-j}^{t+j} (\tau - t) \cdot \Delta C_\gamma(k,t)$$

Figure 2:
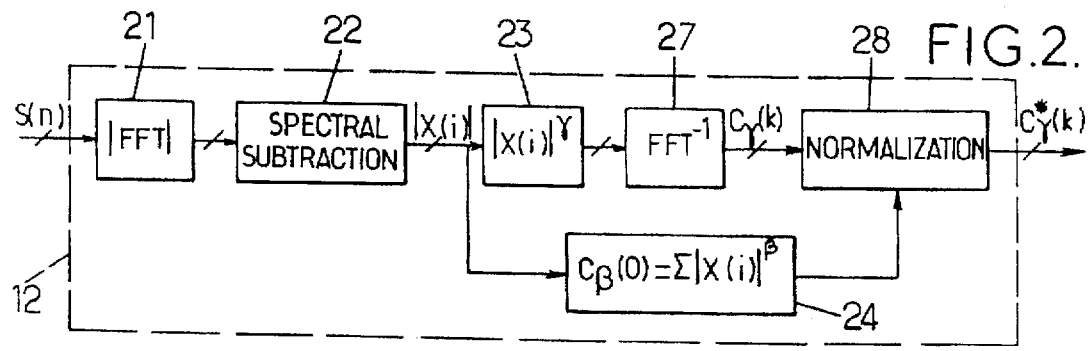
FIGS. 2, 3, 4 and 2A represent, in schematic form variants of modules for calculating the root-cepstral coefficients usable in the system of FIG. 1.

Another possible transformation illustrated in FIG. 2 consists in normalizing the coefficients $C_\gamma(k)$ (block 28) by dividing them by the quantity $$C_\beta(0) = \sum_{i=0}^{N-1} |X(i)|^\beta$$

in which β denotes a number lying between 0 and 2 which is not necessarily equal to the exponent γ of the root function. The normalization has the effect of rendering the coefficients $C_\gamma^*(k)$ thus obtained insensitive to variations in the signal gain. The parameter β can be chosen so as to optimize the representation of the signal in the noise. When β=γ, the calculation bloc 24 is not necessary, the quantity $C_\beta(0)=C_\gamma(0)$ being available as a result of the inverse Fourier transform for K=0.

Figure 2A:
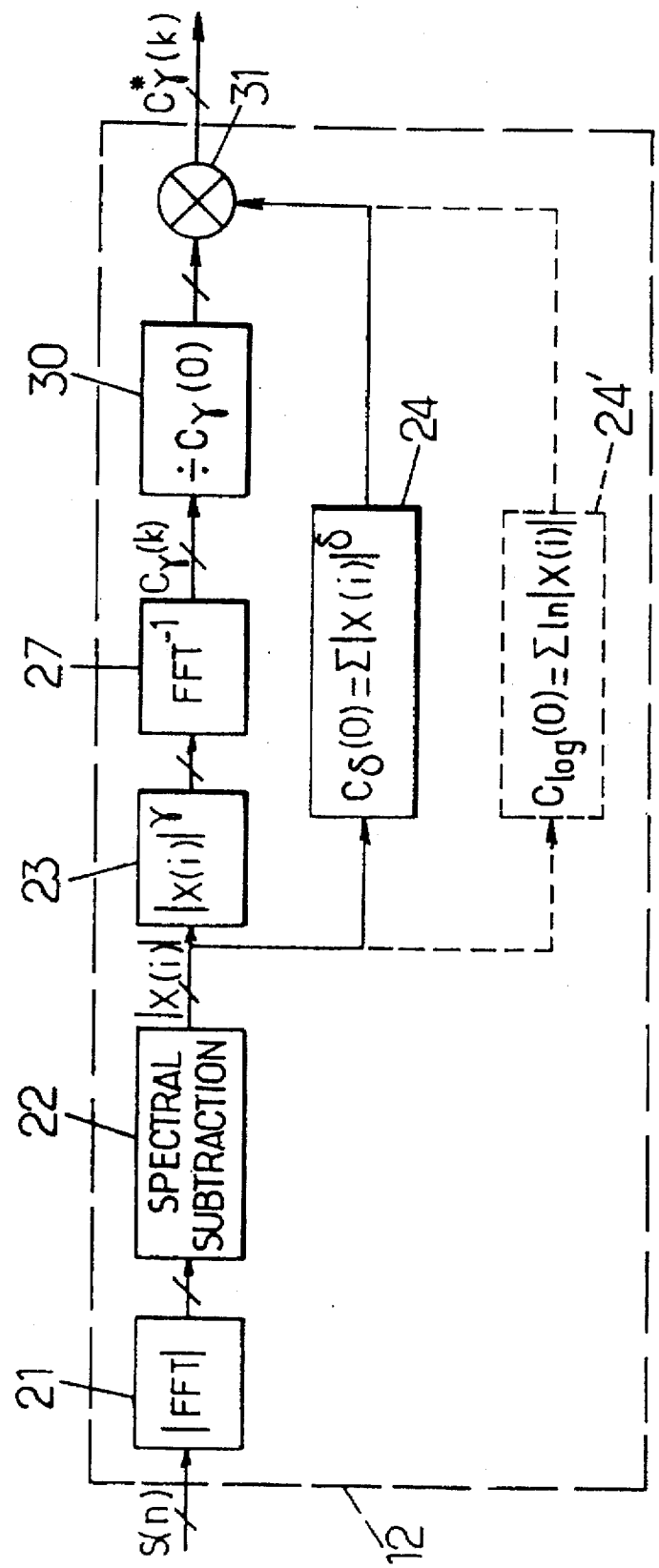

Another way of normalizing the root-cepstral coefficients $C_\gamma(k)$ is illustrated in FIG. 2A. A first normalization stage 30 divides each $C_\gamma(k)$ by $C_\gamma(0)$. The second normalization stage 31 is a multiplier that multiplies each $C_\gamma(k)/C_\gamma(0)$ from the first stage 30 by $C_\delta(0)$ as calculated by bloc 24, with $0<\delta<\gamma$. This normalization scheme is a compromise between the case where no normalization is performed and the case where normalization is performed as shown in FIG. 2 with $\beta=\gamma$.

When $\gamma<<1$, $C_\delta(0)$ is an approximation of the log-energy of the signal, and the compromise results in a normalization strategy robust to a very large scale of mismatch conditions. It is also possible to perform the normalization directly by means of the log-energy of the signal, i.e. to multiply each $C_\gamma(k)/C_\gamma(0)$ from stage 30 by $$C_{log}(0) = \sum_{i=0}^{N-1} \ln(|X(i)|)$$

bloc 24 being replaced by a bloc 24', shown in dashed lines in FIG. 2A, which calculates the log-energy $C_{log}(0)$.

The normalized root-cepstral coefficients $C_\gamma^*(k)$ can be addressed directly as input to the learning and recognition modules, or they may firstly be transformed by a conventional process of linear prediction (see for example "Linear Prediction: A tutorial", by J. Makhoul, Proc. IEEE, Vol. 63, N*4, April 1975; and "Effectiveness of Linear Prediction Characteristics of the Speech Wave for Automatic Speaker Identification and Verification", by B. S. Atal, J. Acoust, Soc. Am., Vol. 55, N*6, June 1974). Implementation of the linear prediction is therefore carried out as follows: the linear prediction coefficients $A_1^\gamma$ are calculated by solving the Yule Walker equations:

$$A_1^\gamma = -C_\gamma^*(i) = \sum_{k=1,k+1}^{p} A_k^\gamma \cdot C_\gamma^*(i-k)$$

where p is the order of the prediction (capable of varying from 1 to 20, and $C_\gamma^*(k)$ is the k-th normalized root-cepstral coefficient with $\beta=\gamma$ (scheme of FIG. 2).

Another set of cepstral coefficients is calculated next. The new cepstral coefficients $C_\gamma^{LP}(k)$ arising from the linear prediction analysis are calculated from $A_i^\gamma$ through the following recursive formulae:

$$C_\gamma^{LP}(1) = -A_1^\gamma$$

$$C_\gamma^{LP}(k) = -A_k^\gamma - \sum_{i=1}^{k-1} A_i^\gamma \cdot C_\gamma^{LP}(k-i)$$

for k varying from 2 to the order p of the prediction.

Comparison with the models stored in the dictionary 16 is then carried out on the basis of the transformed cepstral coefficients $C_\gamma^{LP}(k)$. by applying the homomorphic root transformation no significant differences in efficiency have been observed between the direct use of the root-cepstral coefficients $C_\gamma(k)$ (LFCC) and their use with linear prediction $C_\gamma^{LP}(k)$ (LPCC), it being understood that, in the latter case, the root-cepstral coefficients are regarded as an autocorrelation function when solving the Yule Walker equations.

It will be noted that the linear prediction and recursive calculation approach is suitable only when the $C_\gamma^*(k)$'s subjected to linear prediction are given by $C_\gamma(k)/C_\gamma(0)$. However, this approach is also compatible with the normalization scheme illustrated in FIG. 2A where the coefficients are further multiplied by $C_\delta(O)$ or $C_{log}(0)$. In the latter case, the output of the first normalization stage 30 is subjected to the above-described linear prediction and recursive calculation, and the LPCC coefficients $C_\gamma^{LP}(k)$ thereby obtained are then multiplied by $C_\gamma(0)$ or $C_{log}(0)$.

Figure 3:
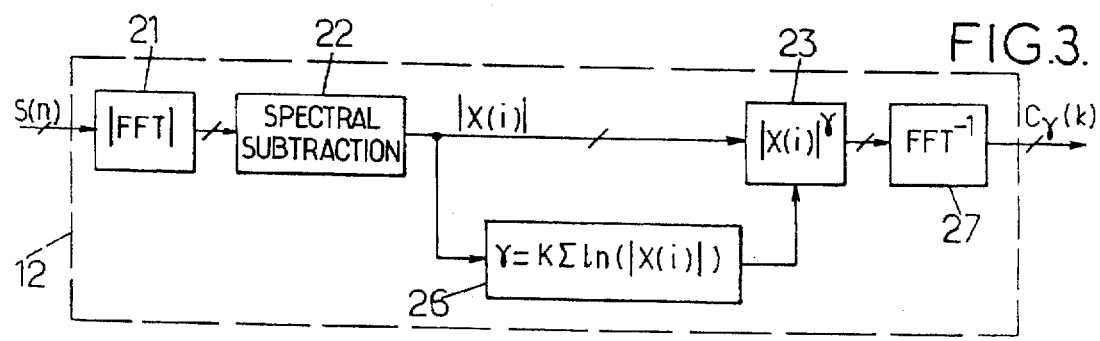

FIG. 3 shows a variant embodiment of the calculation module 12 allowing dynamic adaptation of the exponent $\gamma$ for each frame during the recognition phase. With each frame, the exponent $\gamma$ is calculated by the block 26 through the formula:

$$\gamma = K \cdot \sum_{i=0}^{N-1} \ln(|X(i)|)$$

where ln(.) denotes the natural logarithm, and K denotes an adaptation factor chosen so as to control the range of values taken by $\gamma$ ($\gamma_{min}<\gamma<\gamma_{max}$, with $0<\gamma_{min}<\gamma_{max}<2$). By way of example, it is possible to use K=0.025/N, for $\gamma_{min}=0.1$ and $\gamma_{max}=0.5$. This adaptation of the exponent takes place in the recognition phase so as to optimize the robustness of the system in the presence of noise. In the learning phase, it is preferable to use the same exponent adaptation procedure. Of course, adaptation functions other than that specified above can be envisaged.

Figure 4:
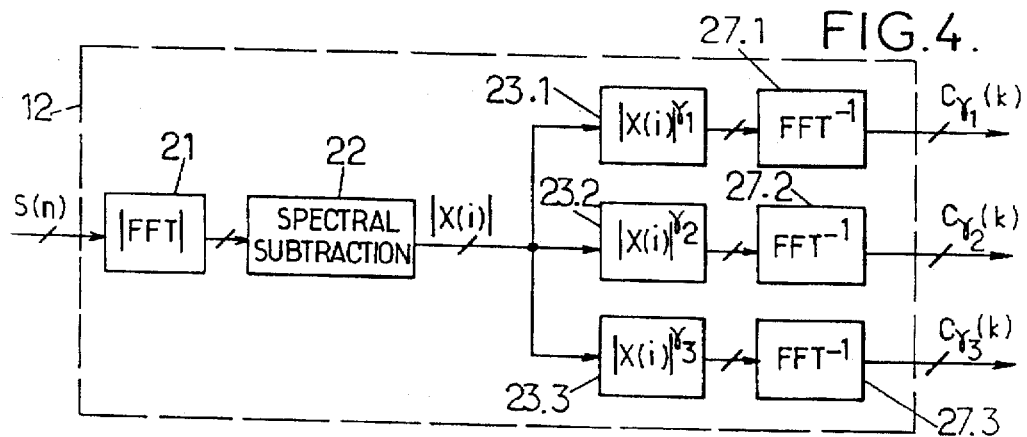

FIG. 4 shows another variant embodiment of the calculation module 12, in which the root-cepstral coefficients are calculated for three discrete value $\gamma_1$, $\gamma_2$ and $\gamma_3$ of the exponent $\gamma$ lying between 0 and 2 during the recognition phase. The blocs 23.1, 23.2 and 23.3 calculate the magnitudes $|X(i)|^{\gamma_1}$, $|X(i)|^{\gamma_2}$ and $|X(i)|^{\gamma_3}$ which are each subjected to the inverse Fourier transform at 27.1 27.2 and 27.3. Typical values for the exponents $\gamma_1$, $\gamma_2$ and $\gamma_3$ are ¼, ⅔ and 1 respectively. With each frame, the three sets of coefficients $C_{\gamma 1}(k)$, $C_{\gamma 2}(k)$, $C_{\gamma 3}(k)$ are addressed in parallel to the recognition module 14 which then retains the set of coefficients providing the closest correspondence with one of the models stored in the dictionary 16. This selecting of the exponent $\gamma$ allows optimization of the recognition rate while merely increasing the volume of calculation in proportion to the number of discrete values used. In the learning phase, the HMM models are set up with a fixed value of the exponent equal to the smallest value $\gamma_1$ among the discrete values used in the recognition phase.

We claim:

1. A speech processing method comprising a learning phase during which a signal originating from a sensor is processed to obtain parameters which represent voice structures uttered by a user in a mildly noise environment and said parameters are stored in a dictionary, and a subsequent recognition phase during which the signal originating from the sensor is processed to obtain parameters which are compared with those stored in the dictionary so as to recognize voice structures uttered by the user in a noisy environment, wherein the obtaining of said parameters during the learning and recognition phases includes the steps of:

forming frames of predetermined length from the signal originating from the sensor;

transforming each frame from the time domain to the frequency domain to obtain a spectrum X(i); and determining the magnitude $|X(i)|^\gamma$, where $|X(i)|$ represents the modulus of the spectrum and $\gamma$ represents an exponent lying between ½ and ¾;

applying an inverse transformation, from the frequency domain to the time domain, to said magnitude $|X(i)|^\gamma$.

2. The method as claimed in claim 1, wherein the exponent $\gamma$ is constant and of the order of ⅔.

3. A speech processing method comprising a learning phase during which a signal originating from a sensor is processed to obtain parameters which represent voice structures uttered by a user in a mildly noisy environment and said parameters are stored in a dictionary, and a subsequent recognition phase during which the signal originating from the sensor is processed to obtain parameters which are compared with those stored in the dictionary so as to recognize voice structures uttered by the user in a noisy environment, wherein the obtaining of said parameters during the learning and recognition phases includes the steps of:

forming frame of predetermined length from the signal originating from the sensor;

transforming each frame from the time domain to the frequency domain to obtain spectrum X(i); and determining the magnitude $|X(i)|^\gamma$, where $|X(i)|$ represents the magnitude of the spectrum and $\gamma$ represents an exponent lying between 0 and 2, applying an inverse transformation, from the frequency domain to the time domain, to said magnitude $|X(i)|^\gamma$; and wherein, in the recognition phase, the exponent $\gamma$ is adapted dynamically for each frame.

4. The method as claimed in claim 3, wherein, in the recognition phase, the exponent $\gamma$ is calculated for each frame via the formula $$\gamma = K \cdot \sum_{i=0}^{N-1} \ln(|X(i)|)$$

where K denotes a positive adaptation factor, N denotes the number of digital samples in the frame, and ln(.) denotes the natural logarithm.

5. A speech processing method comprising a learning phase during which a signal originating from a sensor is processed to obtain parameters which represent voice structures uttered by a user in a mildly noisy environment and said parameters are stored in a dictionary, and a subsequent recognition phase during which the signal originating from the sensor is processed to obtain parameters which are compared with those stored in the dictionary so as to recognize voice structures uttered by the user in a noisy environment, wherein the obtaining of said parameters during the learning and recognition phases includes the steps of:

forming frames of predetermined length from the signal originating from the sensor;

transforming each frame from the time domain to the frequency domain to obtain a spectrum X(i); and determining the magnitude $|X(i)|^\gamma$, where $|X(i)|$ represents the modulus of the spectrum and $\gamma$ represents an exponent lying between 0 and 2;

applying an inverse transformation, from the frequency domain to the time domain, to said magnitude $|X(i)|^\gamma$; and wherein, in the recognition phase, the exponent $\gamma$ is selected from among a plurality of discrete values lying between 0 and 2.

6. The method as claimed in claim 5, wherein in the recognition phase, the inverse transformation, from the frequency domain to the time domain, is applied to each of the magnitudes $|X(i)|^\gamma$, where the exponent $\gamma$ corresponds to the plurality of discrete values, to obtain respective parameter sets, and wherein, for each frame, the exponent $\gamma$ is selected by retaining one of said parameter sets affording the closest correspondence with one of the voice structures represented by parameters stored in the dictionary.

7. The method as claimed in claim 5, wherein said plurality of discrete values consists of three discrete values which are of the order of ¼, ⅔ and 1 respectively.

8. The method as claimed in claim 5, wherein, in the learning phase, the inverse transformation, from the frequency domain to the time domain, is applied to the magnitude $|X(i)|^{\gamma_1}$, where $\gamma_1$ denotes the smallest value among said plurality of discrete values.

9. The method as claimed in claim 1 further comprising, in each of the learning and recognition phases, a step of applying a pre-emphasis to the signal originating from the sensor by a filter having a transfer function, in the frequency domain, of the form 1-a/z, where a denotes a coefficient lying between 0.7 and 1.

10. The method as claimed in claim 1 wherein the coefficients $C_\gamma(k)$ obtained by applying the said inverse transformation are normalized by dividing them by a factor $$C_\beta(0) = \sum_{i=0}^{N-1} |X(i)|^\beta$$

where N denotes the number of digital samples per frame and $\beta$ denotes a number lying between 0 and 2.

11. The method of claim 10, wherein $\beta=\gamma$, and wherein the normalized coefficients $C_\gamma(k)/C_\gamma(0)$ are further multiplied by a factor $$C_\delta(0) = \sum_{i=0}^{N-1} |X(i)|^\delta$$

where N denotes the number of digital samples per frame and $0<\delta<\gamma$.

12. The method of claim 10, wherein $\beta=\gamma$, and wherein the normalized coefficients $C_\gamma(k)/C_\gamma(0)$ are further multiplied by a factor $$C_{log}(0) = \sum_{i=0}^{N-1} \ln(|X(i)|)$$

where N denotes the number of digital samples per frame and ln(.) denotes the natural logarithm.

13. The method as claimed in claim 10, wherein $\beta=\gamma$, further comprising steps of:

applying a linear prediction to the normalized coefficients; and applying a recursive calculation to the results of the linear prediction to obtain another set of coefficients, and wherein the parameters forming the subject of the comparison with the parameters stored in the dictionary consist of said other set of coefficients.

14. The method of claim 13, wherein each coefficient of said other set of coefficients is multiplied by a factor $$C_\delta(0) = \sum_{i=0}^{N-1} |X(i)|^\delta$$

where N denotes the number of digital samples per frame and $2<\delta<\gamma$.

15. The method of claim 13, wherein each coefficient of said other set of coefficients is multiplied by a factor $$C_{log}(0) = \sum_{i=0}^{N-1} \ln(|X(i)|)$$

where N denotes the number of digital samples per frames and ln(.) denotes the natural logarithm.

* * * * *